(12) United States Patent
Sakai

(10) Patent No.: US 11,570,619 B2
(45) Date of Patent: Jan. 31, 2023

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 16/576,097

(22) Filed: Sep. 19, 2019

(65) Prior Publication Data

US 2020/0015084 A1 Jan. 9, 2020

Related U.S. Application Data

(63) Continuation of application No. 15/412,846, filed on Jan. 23, 2017, now Pat. No. 10,440,571.

(30) Foreign Application Priority Data

Jan. 26, 2016 (JP) .................. 2016-012862

(51) Int. Cl.
*H04W 12/06* (2021.01)
*H04W 76/15* (2018.01)
(Continued)

(52) U.S. Cl.
CPC ........ *H04W 12/06* (2013.01); *G06K 7/10722* (2013.01); *G06K 7/1413* (2013.01);
(Continued)

(58) Field of Classification Search
CPC ..... H04W 12/06; H04W 76/15; H04W 12/08; H04W 12/77; H04W 60/04; H04W 84/12;
(Continued)

(56) References Cited

U.S. PATENT DOCUMENTS 8,887,262 B1 * 11/2014 Turner .................. H04W 12/06
726/10
10,360,362 B2 * 7/2019 Rattner ................. H04W 12/04
(Continued)

FOREIGN PATENT DOCUMENTS

EP 1997292 B1 * 11/2018 ........... H04L 63/064

*Primary Examiner* — Trang T Doan
(74) *Attorney, Agent, or Firm* — Canon U.S.A., Inc., IP Division

(57) ABSTRACT

A communication apparatus includes an authentication unit that sets a communication parameter for connecting to a wireless network, and executes authentication processing, with a base station, for registering the communication apparatus to the base station that forms the wireless network, as a management apparatus that is allowed to connect another apparatus to the wireless network, a setting unit that, based on information acquired from code information captured through imaging, sets the communication parameter to another communication apparatus corresponding to the code information, and a registration unit that executes registration processing for registering the other communication apparatus to the base station as the management apparatus, based on at least a condition that the communication parameter is set to the other communication apparatus by the setting unit.

21 Claims, 8 Drawing Sheets

(51) Int. Cl.
  *H04L 9/40* (2022.01)
  *G06K 7/10* (2006.01)
  *G06K 7/14* (2006.01)
  *H04W 12/08* (2021.01)
  *H04W 12/77* (2021.01)
  *H04W 60/04* (2009.01)
  *H04W 84/12* (2009.01)

(52) U.S. Cl.
  CPC ............ *G06K 7/1417* (2013.01); *H04L 63/08* (2013.01); *H04L 63/0884* (2013.01); *H04L 63/10* (2013.01); *H04W 12/08* (2013.01); *H04W 76/15* (2018.02); *H04W 12/77* (2021.01); *H04W 60/04* (2013.01); *H04W 84/12* (2013.01)

(58) Field of Classification Search
  CPC ............ G06K 7/10722; G06K 7/1413; G06K 7/1417; H04L 63/08; H04L 63/0884; H04L 63/10
  See application file for complete search history.

(56) References Cited

U.S. PATENT DOCUMENTS

| | | | | |
|---|---|---|---|---|
| 2007/0239877 A1* | 10/2007 | Uchida | ............... | H04W 12/069 709/228 |
| 2012/0252516 A1* | 10/2012 | Miyabayashi | .......... | H04W 4/02 455/515 |
| 2013/0036231 A1* | 2/2013 | Suumaki | ............... | H04W 12/04 709/228 |
| 2013/0050259 A1* | 2/2013 | Ahn | ....................... | G06F 3/1454 345/633 |
| 2014/0068719 A1* | 3/2014 | Kiukkonen | ........... | H04W 12/50 726/4 |
| 2014/0086134 A1* | 3/2014 | Smadi | ................... | H04L 67/104 370/312 |
| 2014/0269646 A1* | 9/2014 | Ramasamy | ........... | H04W 76/14 370/338 |
| 2015/0172925 A1* | 6/2015 | Leppanen | ............. | H04W 12/04 726/7 |
| 2015/0223068 A1* | 8/2015 | Thelen | ................ | H04W 12/069 726/7 |
| 2015/0245281 A1* | 8/2015 | Beguin | ................. | H04W 12/35 370/255 |
| 2015/0358820 A1* | 12/2015 | Li | .......................... | H04W 12/50 380/270 |
| 2016/0050566 A1* | 2/2016 | Li | .......................... | H04W 12/06 726/6 |
| 2016/0087967 A1* | 3/2016 | Pang | ..................... | H04W 12/50 726/6 |
| 2016/0112418 A1* | 4/2016 | Lu | ....................... | H04L 63/0815 726/7 |
| 2016/0127950 A1* | 5/2016 | Gupta | ................... | H04W 8/005 370/255 |
| 2016/0162897 A1* | 6/2016 | Feeney | ................. | H04L 9/3247 705/71 |
| 2016/0360561 A1* | 12/2016 | Lee | ..................... | H04N 5/23206 |
| 2017/0118530 A1* | 4/2017 | Amano | ............. | H04N 21/6175 |

* cited by examiner

COMMUNICATION APPARATUS, COMMUNICATION METHOD, AND STORAGE MEDIUM

CROSS-REFERENCE TO RELATED APPLICATIONS

This is a continuation application of U.S. patent application Ser. No. 15/412,846 filed on Jan. 23, 2017 now U.S. Pat. No. 10,440,571 which claims the benefit of Japanese Patent Application No. 2016-012862, filed Jan. 26, 2016, both of which are hereby incorporated by reference herein in its entirety.

BACKGROUND

Field

The present disclosure relates to a communication technique.

Description of the Related Art

In recent years, there have been increased opportunities of using electronic apparatuses having a wireless communication function, such as a digital camera, a printer, a mobile phone, and a smartphone with these apparatuses being connected to a wireless network.

In order to connect an electronic apparatus to a wireless network, a user has to set various communication parameters such as an encryption method, an encryption key, an authentication method, and an authentication key. A technique for facilitating settings of these communication parameters is discussed in Japanese Patent Application Laid-Open No. 2014-60623. According to the technique discussed in Japanese Patent Application Laid-Open No. 2014-60623, an electronic apparatus displays a quick response code QR Code®, which indicates the communication parameters. Then, a mobile terminal captures an image of the QR Code® and reads the QR Code® therefrom to acquire communication parameters to set the read communication parameters to an access point. The access point sets the communication parameters having been used for wirelessly communicating with another apparatus to the electronic apparatus through the network based on the communication parameters set by the mobile terminal.

As discussed in Japanese Patent Application Laid-Open No. 2014-60623, by setting the communication parameters using captured code information such as a two-dimensional code capable of encoding a large volume of information, complicated inputs performed by the user can be reduced.

However, if all of apparatuses having the image-capturing function can set the communication parameters, an unintended apparatus can be allowed to set the communication parameters to the access point or to communicate with the access point.

SUMMARY

According to an aspect of the present invention, a communication apparatus includes an authentication unit configured to set a communication parameter for connecting to a wireless network, and execute authentication processing, with a base station, for registering the communication apparatus to the base station that forms the wireless network as a management apparatus that is allowed to connect another apparatus to the wireless network, a setting unit configured to, based on information acquired from code information captured through imaging, set the communication parameter to another communication apparatus corresponding to the code information, and a registration unit configured to execute registration processing for registering the another communication apparatus to the base station as the management apparatus, based on at least a condition that the communication parameter is set to the another communication apparatus.

According to another aspect of the present invention, a communication apparatus includes a forming unit configured to form a wireless network, an authentication unit configured to set a communication parameter for connecting to a wireless network, and execute authentication processing for registering another apparatus, as a management apparatus to be connected to the wireless network, based on displayed code information, and a registration unit configured to register as the management apparatus a second communication apparatus indicated by a registration request from a first communication apparatus that has succeeded in the authentication processing without executing the authentication processing with the second communication apparatus.

Further features will become apparent from the following description of exemplary embodiments with reference to the attached drawings.

DESCRIPTION OF THE EMBODIMENTS

It is considered that authority to set communication parameters by using captured code information is provided and the authority is given to an apparatus that has succeeded in authentication with an access point. Providing such authority enables the access point not to accept the communication parameters set by an unauthorized apparatus and connection using the communication parameters set by an unauthorized apparatus.

However, providing of the authority to set the communication parameters can complicate operation or processing for making registration of the authority to set the communication parameters can be complicated. For example, in a case where the authority to set the communication parameters is given to a plurality of apparatuses, each of the plurality of apparatuses has to execute similar authentication processing with the access point in order to register the authority to set the communication parameters. The plurality of apparatuses each executing the similar processing can require complicated operations, resulting in degradation of usability.

An exemplary embodiment is directed to a technique for improving usability in additionally registering an apparatus authorized to set the communication parameters by using code information obtained through imaging.

A communication apparatus according to the present exemplary embodiment will be described in detail with reference to the attached drawings. Hereinafter, a description is provided of an exemplary embodiment using a wireless local area network (LAN) system compliant with the Institute of Electrical and Electronics Engineers, Inc. (IEEE) 802.11 series. However, the communication mode is not limited to the wireless LAN compliant with the IEEE 802.11 series.

Figure 3:
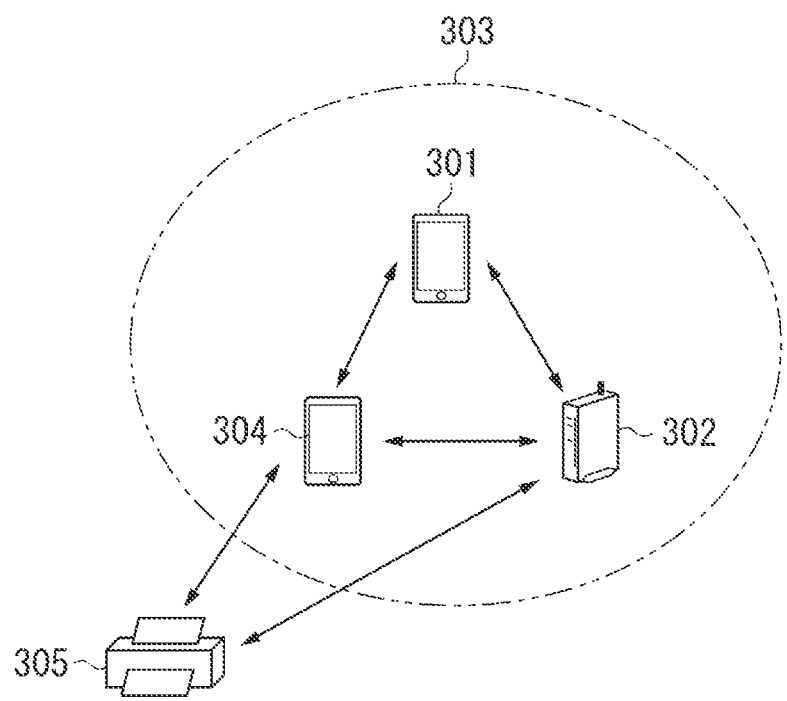
FIG. 3 is a diagram illustrating an example of a configuration of a communication system.

A communication system according to the present exemplary embodiment is illustrated in FIG. 3. The communication system illustrated in FIG. 3 includes a smartphone 301, an access point 302, a smartphone 304, and a printer 305. A wireless LAN network 303 (hereinafter, referred to as "network 303") is a wireless network compliant with the wireless LAN formed by the access point 302. The access point 302 operates as a base station in the network 303. Further, the access point 302 operates as an access point in an infrastructure mode specified by the IEEE 802.11 series standards. Each of the other apparatuses 301, 304, and 305 operates as a station (STA) in the infrastructure mode specified by the IEEE 802.11 series standards. The apparatuses in the communication system according to the present exemplary embodiment can be other apparatuses such as personal computers (PCs), video cameras, smartwatches, and personal digital assistances (PDAs). Although a description is provided of the communication system including four apparatuses, the number thereof can be two, three, five or more.

Figure 1:
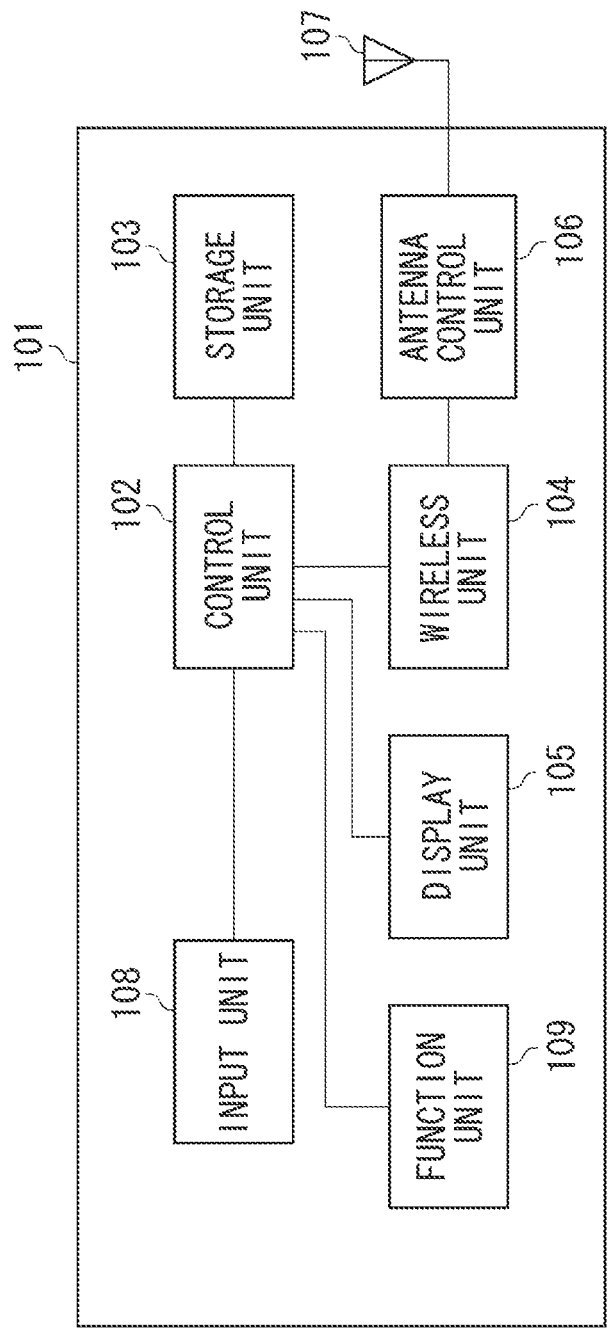
FIG. 1 is a block diagram illustrating a configuration of a communication apparatus.

Next, a hardware configuration of each of the apparatuses (i.e., the smartphones 301, 304, the access point 302, and the printer 305) in the communication system illustrated in FIG. 3 according to the present exemplary embodiment will be described with reference to FIG. 1. In FIG. 1, an apparatus 101 represents the entire apparatus. A control unit 102 controls the apparatus 101 by executing a control program stored in a storage unit 103. The control unit 102 includes, for example, a central processing unit (CPU). The storage unit 103 stores a control program executed by the control unit 102 and various types of information such as image data and communication parameters. Various operations described below are executed by the control unit 102 executing the control program stored in the storage unit 103. For example, the storage unit 103 includes a storage medium such as a hard disk drive (HDD), a flash memory, a read only memory (ROM), a random access memory (RAM), or a secure digital (SD) card that is attachable to and detachable from the apparatus 101.

A wireless unit 104 executes wireless LAN communication compliant with the IEEE 802.11 series standards. The wireless unit 104 includes a chip for executing wireless communication. A display unit 105 is, for example, a liquid crystal display (LCD) or a light-emitting diode (LED) that displays various kinds of information by outputting visually recognizable information, and in some instances, can also output audio information via a unit such as a speaker. The display unit 105 includes a video RAM (VRAM) for storing image data corresponding to visual information to be displayed in a case where the display unit 105 displays visual information. The display unit 105 executes display control for continuously displaying the image data stored in the VRAM on a display such as an LCD. In addition, a QR Code® described below is displayed on the display unit 105. Instead of displaying the QR Code®, described below, on the display unit 105, the QR Code® can be attached to a housing of a communication apparatus in the form of a sticker or label, or can be printed in a communication apparatus' instruction manual or on a communication apparatus' packing material such as cardboard used to ship/deliver the communication apparatus.

The control unit 102 controls a function unit 109 to execute predetermined processing such as image capturing or printing. The function unit 109 is hardware that enables the communication apparatus 101 to execute predetermined processing. For example, in a case where the communication apparatus 101 is the smartphone 301 or 304, the function unit 109 is an imaging unit that executes image-capturing processing. The imaging unit includes an image sensor and a lens and captures still images or a moving image. In the present exemplary embodiment, the imaging unit, for example, reads the code information such as a one-dimensional code including a barcode and a two-dimensional code including a computer purpose (CP) code or a QR Code®. For example, in a case where the communication apparatus 101 is the printer 305, the function unit 109 is a printing unit that executes printing processing. In addition, the access point 302 does not have to include the function unit 109 in a case where the access point 302 is a dedicated apparatus operating as a base station.

An antenna control unit 106 executes output control of an antenna 107, and the antenna 107 communicates through the wireless LAN, which is communicable with a bandwidth of 2.4 GHz and/or 5 GHz. A user executes various inputs through an input unit 108 to operate the communication apparatus 101. The input unit 108 stores a flag corresponding to an input in a memory of, for example, the storage unit 103.

Figure 2:
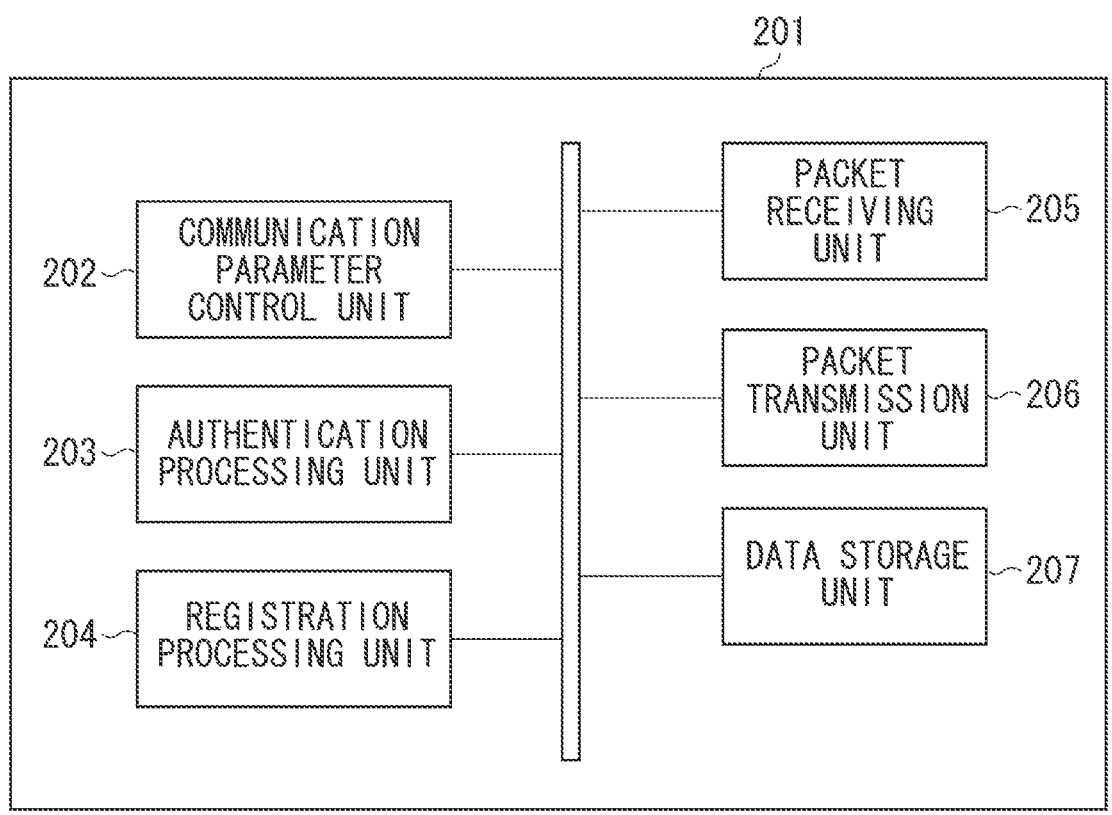
FIG. 2 is a block diagram illustrating a software functional configuration of the communication apparatus.

FIG. 2 is a block diagram illustrating an example of a configuration of software functional blocks for the communication apparatus in the communication system to realize the below-described communication control functions. A software function block 201 represents the entire software functional blocks. A communication parameter control unit 202 executes communication parameter sharing processing for sharing the communication parameters between communication apparatuses. In the communication parameter sharing processing, a providing apparatus provides the communication parameters for executing wireless communication to a receiving apparatus. Here, the communication parameters include wireless communication parameters necessary for executing the wireless LAN communication, e.g., a service set identifier (SSID) as a network identifier, an encryption method, an encryption key, a network key, an authentication method, and an authentication key. Further, the communication parameters can include a media access control (MAC) address, a passphrase, an internet protocol (IP) address for communicating in an IP layer, and information necessary for a higher-level service. The communication parameter control unit 202 executes the communication parameter sharing processing by using the information acquired from a captured image of code information.

An authentication processing unit 203 executes authentication processing with another communication apparatus in the communication parameter sharing processing. If authentication with the other communication apparatus succeeds in the authentication processing executed by the authentication processing unit 203, the communication parameter control unit 202 exchanges the communication parameters with the other communication apparatus.

A registration processing unit 204 executes registration processing for registering the management apparatus in a base station. The management apparatus is an apparatus authorized to set the communication parameters to another communication apparatus by using captured code information.

A packet receiving unit 205 and a packet transmission unit 206 control reception and transmission of various packets including communication protocols of upper layers. The packet receiving unit 205 and the packet transmission unit 206 control the wireless unit 104 so as to execute transmission and reception of packets compliant with the IEEE 802.11 series standards with another communication apparatus. A data storage unit 207 controls reading and writing of software, and various types of information into and from the storage unit 103.

A description will now be provided of an operation of the communication system according to the present exemplary embodiment having the above-described configuration. Hereinafter, description is given of an example in which each of the communication apparatuses connects to the wireless LAN network 303 by setting the communication parameters for connecting to the wireless LAN network 303 using captured code information, such as a QR Code®. The smartphone 301 executes authentication processing with the access point 302 in order to acquire authority to operate as a management apparatus that sets the communication parameters to another communication apparatus by using the captured code information. The smartphone 301 sets the communication parameters to the smartphone 304 using the captured code information, and registers the smartphone 304 in the access point 302 as the management apparatus. The smartphone 304 that is registered in the access point 302 as the management apparatus by the smartphone 301 sets the communication parameters to the printer 305 by using the captured code information.

Figure 4:
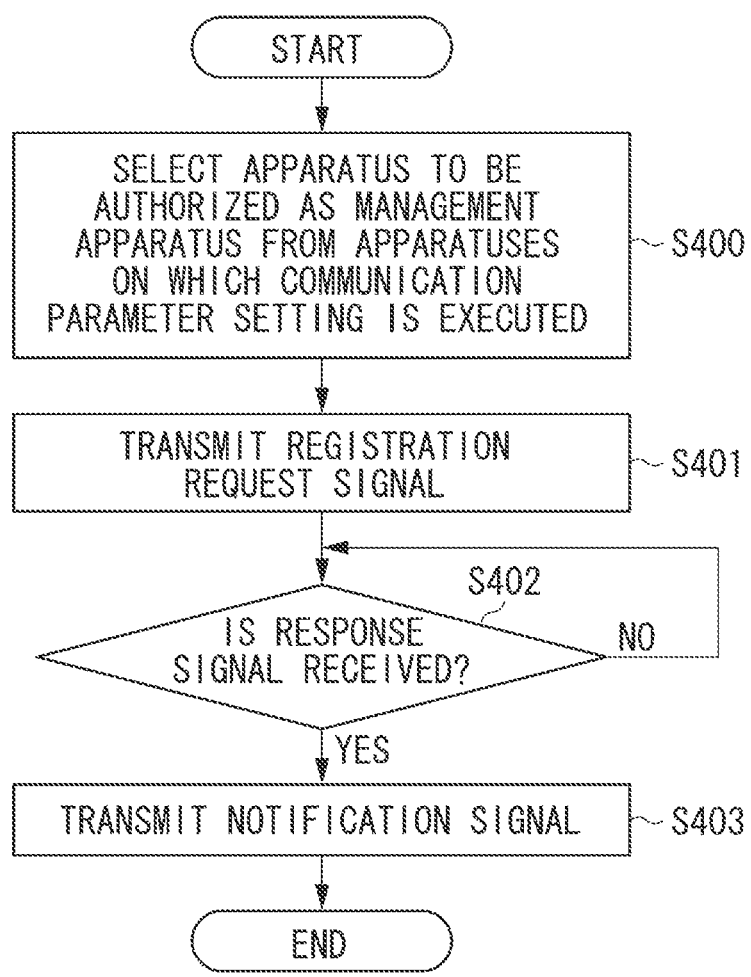
FIG. 4 is a flowchart illustrating an operation of a smartphone.
Figure 7:
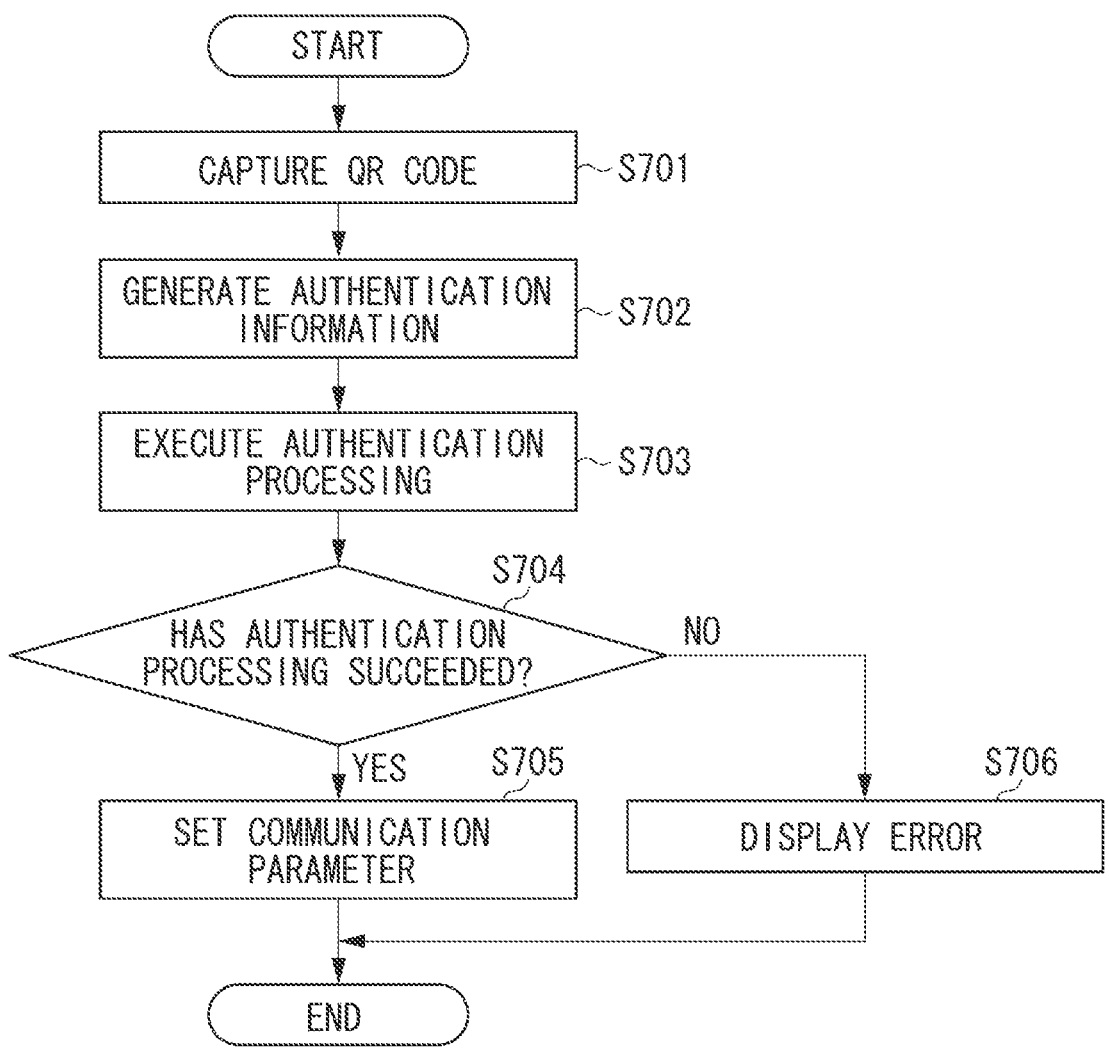
FIG. 7 is a flowchart illustrating processing executed by a smartphone.

An operation of the smartphone 301 will be described with reference to flowcharts illustrated in FIGS. 4 and 7. The flowcharts illustrated in FIGS. 4 and 7 are realized by the control unit 102 of the smartphone 301 executing the control program stored in the storage unit 103 to execute calculation and processing of information and control of respective pieces of hardware. In addition, all or a part of the steps illustrated in the flowcharts in FIGS. 4 and 7 can be realized with hardware such as application specific integration circuits (ASIC).

First, processing for acquiring the authority to operate as the management apparatus from the access point 302 executed by the smartphone 301 will be described with reference to FIG. 7. The flowchart illustrated in FIG. 7 is started in a case where a user sets the communication parameters to the access point 302 and inputs an instruction to execute the processing for acquiring the authority to operate as the management apparatus from the access point 302 through the input unit 108 of the smartphone 301. In FIG. 7, in a case where the user inputs an instruction for starting the processing, the smartphone 301 activates the function unit 109 (imaging unit). At this time, a display prompting the user to capture the code information of the access point 302 can be displayed on the display unit 105.

In step S701, the smartphone 301 captures the code information with the function unit 109 (imaging unit) and decodes the code information based on the captured image. In a case where the information necessary for the communication parameter sharing processing is not included in the code information acquired in step S701, the smartphone 301 can end the processing as an error. In addition, although the code information to be captured is described as a QR Code® in the present exemplary embodiment, the code information can be other types of code information, such as a barcode and a CP code.

As the information necessary for the communication parameter sharing processing, the smartphone 301 acquires, from the code information, a public key and an apparatus identifier that are information used for the authentication processing. For example, the apparatus identifier can be a MAC address or a universally unique identifier (UUID). In step S702, the smartphone 301 generates authentication information used for the authentication processing by using the information used for authentication processing acquired from the captured QR Code®. Here, the QR Code® includes information about the public key, so that the smartphone 301 acquires the authentication information by calculating a hash value with respect to the public key. A hash function used for generating the hash value can be a secure hashing algorithm 1 (SHA-1), a SHA-2, or a message digest algorithm 5 (MD5).

After generating the authentication information in step S702, in step S703, the smartphone 301 starts authentication processing based on the authentication information. In the authentication processing, the smartphone 301 transmits an authentication request signal that requests the authentication processing to another communication apparatus. Here, an Action frame specified by the 802.11 series standard is used for the authentication request signal. However, an extensible authentication protocol (EAP) signal or other wireless LAN packets can be used instead of the Action frame. The authentication request signal includes the authentication information generated in step S702. In addition, the authentication request signal can be transmitted through the unicast transmission by using the apparatus identifier acquired from the code information. The authentication request signal can include other types of information used for the authentication processing, e.g., random numbers, an encryption key such as a public key of the smartphone 301, and an apparatus name in addition to the authentication information.

The smartphone 301 waits for an authentication response signal including a result of the authentication processing executed by the other communication apparatus and authentication information generated by the other communication apparatus. The smartphone 301 that receives the authentication response signal executes authentication based on the information included in the authentication response signal. The authentication can be executed through a public key encryption method, and an identical encryption key can be shared by the smartphone 301 and the access point 302 as a common key. The smartphone 301 can execute authentication by determining whether the authentication information included in the received authentication response signal and the authentication information generated in step S702 conform to each other. The authentication in the authentication processing succeeds if the authentication information included in the received authentication response signal and the authentication information generated in step S702 conform to each other. The smartphone 301 transmits an authentication confirmation signal indicating the authentication result.

In step S704, the smartphone 301 determines whether the authentication processing has succeeded. If the authentication processing has failed (NO in step S704), the processing proceeds to step S706. In step S706, the smartphone 301 displays an error and ends the processing. If the authentication processing has failed, the smartphone 301 can execute authentication processing with the other communication apparatus by transmitting the authentication request signal again.

Through the authentication processing, a common key used for the subsequent encryption communication is kept by the smartphone 301 and the other communication apparatus in a case where the authentication has succeeded. If the authentication processing has succeeded (YES in step S704), the processing proceeds to step S705. In step S705, the smartphone 301 sets the communication parameters to the other communication apparatus. In step S705, the smartphone 301 waits for a setting request signal that requests the communication parameters. The smartphone 301 receives the setting request signal and transmits a response signal including the communication parameters. In addition, the smartphone 301 sets the communication parameters input by the user to the access point 302. The communication parameters are encrypted with the common key shared in the authentication processing. With this configuration, security in providing of the communication parameters can be improved.

In a case where the communication parameters are set to the access point 302 through the above-described processing, the access point 302 establishes the network 303 by using the communication parameters acquired from the smartphone 301. The access point 302 to which the communication parameters have been set registers the smartphone 301 as the management apparatus of the network 303. The management apparatus is an apparatus authorized to set the communication parameters to another communication apparatus by using the captured code information. In other words, the communication apparatus that succeeds in the authentication processing with the access point 302 can acquire the authority to operate as the management apparatus.

In addition, if the network 303 has previously been established in executing of the authentication processing, the access point 302 does not necessarily have to transmit the setting request signal. In other words, if the network 303 has previously been established in executing of the authentication processing, the access point 302 simply registers a partner apparatus on which the authentication processing is performed as the management apparatus and does not necessarily have to receive the communication parameters set by the partner apparatus. In such a case, the access point 302 can transmit the communication parameters for connecting to the established network 303 to the partner apparatus on which the authentication processing is performed.

In a case where the smartphone 301 is registered in the access point 302 as the management apparatus through the above-described processing with the access point 302, the smartphone 301 can set the communication parameters for connecting to the network 303 formed by the access point 302 to other communication apparatus operating as a station.

A description is will now be provided of processing for setting the communication parameters for connecting to the network 303 formed by the access point 302 to another communication apparatus operating as a station, which is executed by the smartphone 301. In addition, the processing is similar to the processing illustrated in the flowchart in FIG. 7.

The smartphone 301 activates the function unit 109 (imaging unit) in a case where an instruction for setting the communication parameters for connecting to the network 303 formed by the access point 302 to another communication apparatus operating as a station is issued through the input unit 108 of the smartphone 301. In addition, if the information indicating that the other communication apparatus is a station is included in the information acquired from the captured QR Code®, the smartphone 301 can start executing the processing for setting the communication parameters to the other communication apparatus without receiving an instruction from the user. If the information indicating that the other communication apparatus is the access point 302 is included in the information acquired from the QR Code®, the smartphone 301 can start executing the processing for acquiring the authority to operate as the management apparatus from the access point 302 without receiving an instruction from the user.

In steps S701 to S703, the smartphone 301 captures the code information of another communication apparatus, e.g., smartphone 304, generates the authentication information, and executes the authentication processing. If the authentication processing fails (NO in step S704), in step S706, the smartphone 301 ends the processing as an error. If the authentication processing succeeds (YES in step S704), in step S705, the smartphone 301 sets the communication parameters for connecting to the access point 302 previously set to the other communication apparatus on which the authentication processing is performed.

The other communication apparatus to which the smartphone 301 has set the communication parameters for connecting to the access point 302 through the above-described processing, connects to the access point 302 based on the communication parameters. At this time, the other communication apparatus to which the communication parameters have been set by the smartphone 301 transmits a connection request signal including management apparatus information that is the information about the smartphone 301 operating as the management apparatus, as well as a providing source of the communication parameters, to the access point 302.

The access point 302 receives the connection request signal and checks whether a communication apparatus indicated by the management apparatus information included in the connection request signal is a registered management apparatus. The access point 302 permits connection of the transmission source of the connection request signal that includes the management apparatus information indicating a registered management apparatus, and does not permit connection of the transmission source of the connection request signal that includes the management apparatus information indicating a non-registered management apparatus.

In other words, the access point 302 permits connection from a communication apparatus having the communication parameters provided by the management apparatus, and does not permit connection from a communication apparatus having the communication parameters provided by a communication apparatus different from the management apparatus.

Next, processing for additionally registering another communication apparatus in the access point 302 as the management apparatus executed by the smartphone 301 will be described with reference to a flowchart in FIG. 4. The flowchart in FIG. 4 is started when the user selects addition of the management apparatus through the input unit 108 of the smartphone 301.

In step S400, the smartphone 301 selects a communication apparatus to be newly authorized as the management apparatus from among the communication apparatuses to which the communication parameters for connecting to the access point 302 that registers the smartphone 301 as the management apparatus have been set through the processing in FIG. 7. The selection in step S400 can be executed based on an operation input by the user through the input unit 108. If the communication parameters have been set to only one communication apparatus, the one communication apparatus can be automatically selected as a communication apparatus to be newly authorized as the management apparatus. If the communication parameters have been set to a plurality of communication apparatuses, the smartphone 301 can automatically select a communication apparatus to be newly authorized as the management apparatus according to a user operation or a priority level. The smartphone 301 gives authority as the management apparatus to another communication apparatus based on at least a condition that the communication parameters have been set based on the information acquired from captured code information.

In step S401, the smartphone 301 transmits a registration request signal for requesting additional registration of the management apparatus to the access point 302 that registers the smartphone 301 as the management apparatus through the above-described authentication processing. In addition, identification information of the communication apparatus selected in step S400 is included in the registration request signal transmitted in step S401.

In step S402, the smartphone 301 waits for a response signal indicating a result of registration processing from the access point 302 as a transmission destination of the registration request signal. If the smartphone 301 receives the response signal (YES in step S402), the processing proceeds to step S403. In step S403, the smartphone 301 transmits a notification signal for notifying the communication apparatus selected in step S400 of the result of the registration processing indicated by the response signal.

Figure 8:
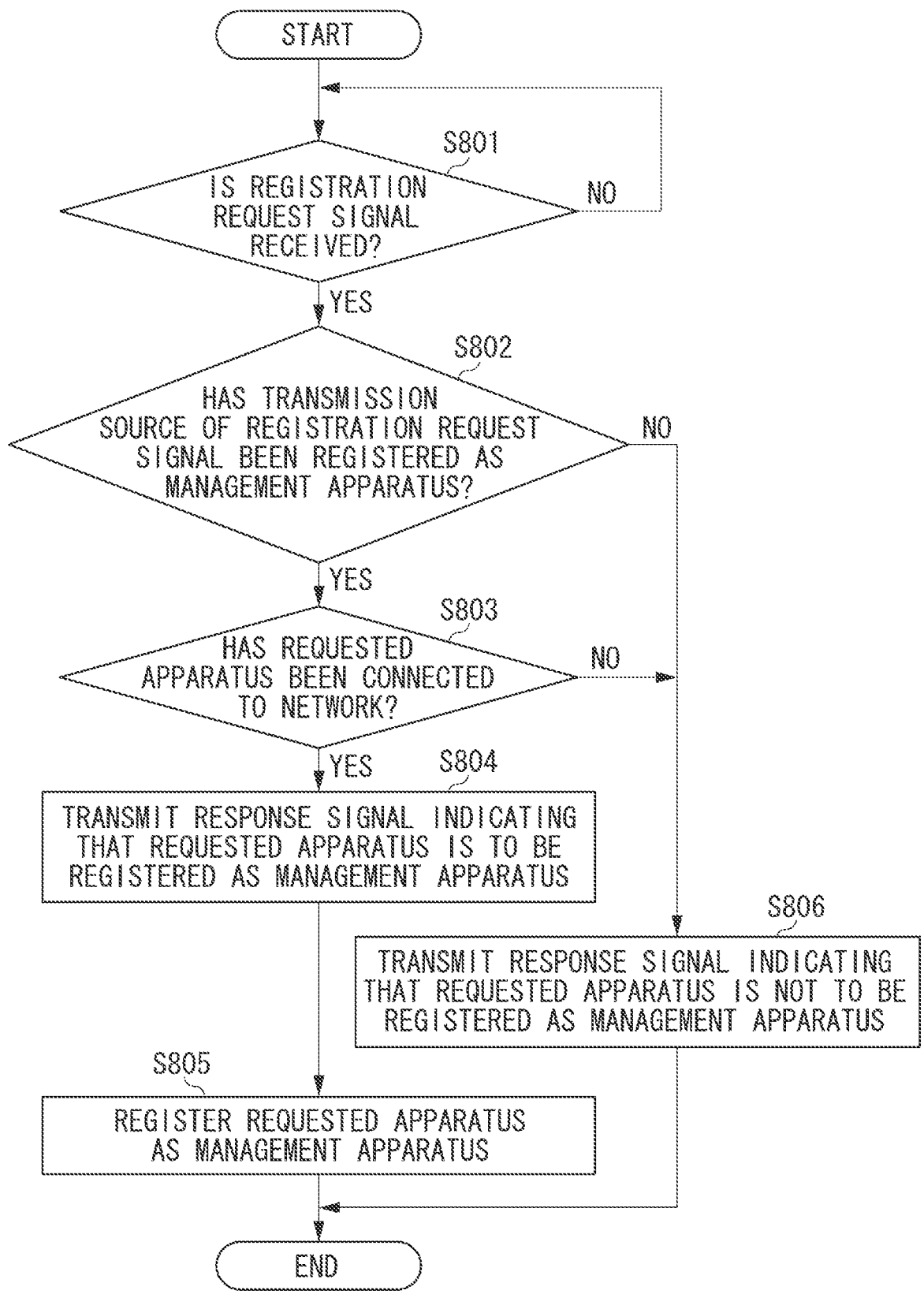
FIG. 8 is a flowchart illustrating processing executed by an access point.

Next, processing executed in a case where the access point 302 receives a registration request signal will be described with reference to the flowchart in FIG. 8. The flowchart illustrated in FIG. 8 is realized by the control unit 102 of the access point 302 executing the control program stored in the storage unit 103 and executing calculation and processing of information and control of respective pieces of hardware. In addition, all or a part of the steps illustrated in the flowchart in FIG. 8 may be realized with the hardware such as ASIC.

In step S801, if the access point 302 receives the registration request signal (YES in step S801), the processing proceeds to step S802. In step S802, the access point 302 checks whether a transmission source of the registration request signal has previously been registered as the management apparatus. If the transmission source of the registration request signal has not been registered as the management apparatus (NO in step S802), the processing proceeds to step S806. In step S806, the access point 302 transmits a response signal indicating that the communication apparatus indicated by the identification information included in the registration request signal is not registered as the management apparatus and ends the processing.

If the transmission source of the registration request signal has been registered as the management apparatus (YES in step S802), the processing proceeds to step S803. In step S803, the access point 302 checks whether the communication apparatus indicated by the identification information included in the registration request signal has connected to the network 303. In the processing of checking in step S803, as long as the communication apparatus indicated by the identification information included in the registration request signal has connected to the network 303 before the access point 302 receives the registration request signal, the communication apparatus does not necessarily have to connect to the network 303 when the access point 302 receives the registration request signal. In other words, the communication apparatus indicated by the identification information included in the registration request signal is only required to be connectable to the network 303 when the access point 302 receives the registration request signal. In addition, the processing in step S803 can be omitted.

If the communication apparatus indicated by the identification information included in the registration request signal has not been connected to the network 303 (NO in step S803), the processing proceeds to step S806. In step S806, the access point 302 transmits a response signal indicating that the communication apparatus indicated by the identification information included in the registration request signal is not to be registered as the management apparatus and ends the processing.

If the communication apparatus indicated by the identification information included in the registration request signal has connected to the network 303 (YES in step S803), the processing proceeds to step S804. In step S804, the access point 302 transmits a response signal indicating that the communication apparatus indicated by the identification information included in the registration request signal is to be registered as the management apparatus to the transmission source of the registration request signal. In addition, the access point 302 can transmit the result of the registration processing to the communication apparatus indicated by the identification information included in the registration request signal. In a case where the access point 302 transmits the response signal indicating that the communication apparatus indicated by the identification information included in the registration request signal is to be registered as the management apparatus, in step S805, the access point 302 newly registers the communication apparatus indicated by the identification information included in the registration request signal as the management apparatus.

In other words, in a case where the access point 302 is requested, from the communication apparatus that the access point 302 has directory authorized and registered as the management apparatus, to register another communication apparatus as the management apparatus, the access point 302 registers the other communication apparatus as the management apparatus without executing the authentication processing with the other communication apparatus.

Figure 5:
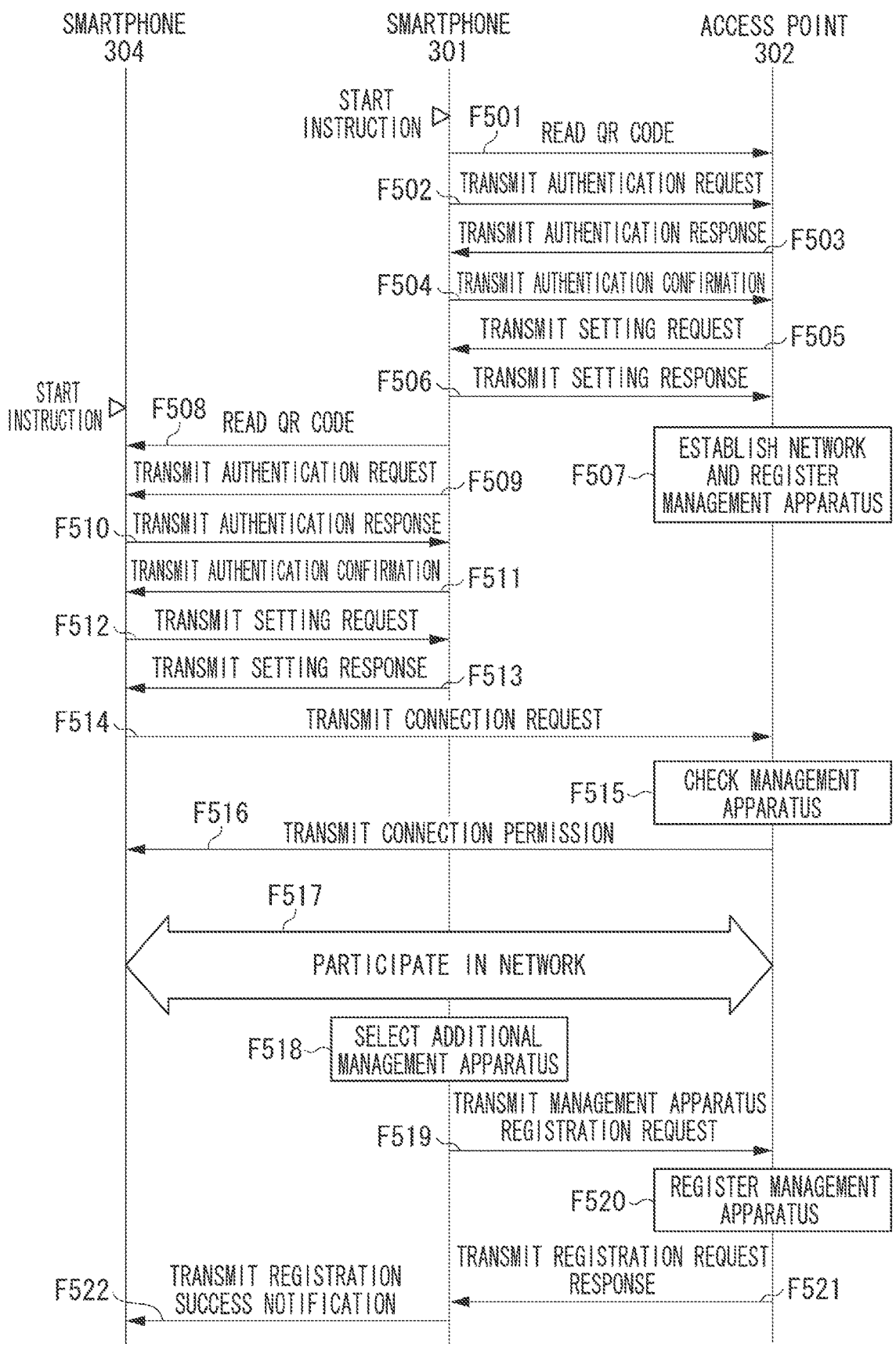
FIG. 5 is a sequence diagram illustrating a sequence of processing executed by communication apparatuses.

Next, processing of the communication system in the present exemplary embodiment will be described with reference to sequence charts in FIGS. 5 and 6. FIG. 5 is a diagram illustrating a sequence of processing in which the smartphone 301 registers the smartphone 304 in the access point 302 as the management apparatus after executing the authentication processing with the access point 302.

After the smartphone 301 receives a processing start instruction from the user, in step F501, the smartphone 301 captures a QR Code® of the access point 302 and acquires information used for the authentication processing from the QR Code®. The smartphone 301 uses the information acquired from the QR Code® to generate authentication information used for the authentication processing. Herein, the QR Code® includes information about the public key as the authentication information, and the smartphone 301 acquires the authentication information by calculating a hash value with respect to the public key.

In addition, the smartphone 301 can retrieve other types of information included in the QR Code®. For example, the smartphone 301 can acquire the MAC address as an identifier of the access point 302 from the QR Code®. The smartphone 301 transmits a signal to be subsequently transmitted through the unicast transmission by using the identifier of the access point 302, which facilitates processing of searching for the access point 302.

In step F502, the smartphone 301 transmits an authentication request signal including the generated authentication information to the access point 302. Here, an Action frame specified by the 802.11 series standard is used for the authentication request signal. Alternatively, an EAP signal or other wireless LAN packets can be used instead of the Action frame.

The access point 302 that has received the authentication request signal executes authentication processing based on the authentication information calculated from the public key of the access point 302 stored in the storage unit 103 in advance thereof and the authentication information included in the authentication request signal. The authentication succeeds in a case where the authentication information generated by the access point 302 and the authentication information included in the authentication request signal conform to each other.

In a case where the authentication succeeds, i.e., in a case where the generated authentication information and the authentication information included in the authentication request signal conform to each other, in step F503, the access point 302 transmits an authentication response signal indicating a success in the authentication to the smartphone 301. The authentication response signal includes information necessary for the authentication in the smartphone 301, e.g., the authentication information, an encryption key, and random numbers generated by the access point 302. Security can be improved by encrypting and transmitting the information such as the authentication information and the encryption key. The encryption can be realized with a Diffie-Hellman (DH) key exchange method or a public key encryption method.

The smartphone 301 receives the authentication response signal and executes the authentication processing based on the information included in the authentication response signal. In a case where the authentication succeeds, in step F504, the smartphone 301 transmits an authentication confirmation signal to the access point 302. The smartphone 301 notifies the access point 302 of a success in the authentication by transmitting the authentication confirmation signal. Through the authentication processing, the smartphone 301 and the access point 302 are brought into a state of having a common key used for the subsequent encryption communication.

After receiving the authentication confirmation signal, in step F505, the access point 302 transmits a setting request signal for requesting the communication parameters to the smartphone 301. After receiving the setting request signal, in step F506, the smartphone 301 transmits a setting response signal including the communication parameters to the access point 302. The communication parameters are encrypted by using the common key shared in the authentication processing. With this configuration, security of providing the communication parameters can be enhanced.

In step F507, the access point 302 that has acquired the communication parameters establishes the network 303 by using the acquired communication parameters and registers the smartphone 301 as the management apparatus. In step F507, the access point 302 registers the MAC address of the smartphone 301, the authentication information and/or the common key in a list of management apparatuses in association with each other.

Next, in a case where the user provides an instruction for setting the communication parameters to another communication apparatus, the smartphone 301 activates a camera. In a case where the user provides the instruction for setting the communication parameters, the smartphone 304 displays a QR Code® including the information necessary for setting the communication parameters. In step F508, the smartphone 301 captures the QR Code® displayed by the smartphone 304 and acquires the information necessary for setting the communication parameters from the QR Code®. The smartphone 301 uses the information acquired from the QR Code® and generates the authentication information used for the authentication processing. In step F509, the smartphone 301 transmits an authentication request signal including the generated authentication information to the smartphone 304.

The smartphone 304 receives the authentication request signal and executes authentication processing based on the authentication information calculated from the stored public key of the smartphone 304 and the authentication information included in the authentication request signal. In a case where the authentication has succeeds, i.e., in a case where the generated authentication information and the authentication information included in the authentication request signal conform to each other, in step F510, the smartphone 304 transmits an authentication response signal indicating a success in the authentication to the smartphone 301. The authentication response signal includes the authentication information generated by the smartphone 304.

The smartphone 301 receives the authentication response signal from the smartphone 304 and executes the authentication processing based on the information included in the authentication response signal. In a case where the authentication has succeeds, i.e., in a case where the generated authentication information and the authentication information included in the authentication response signal conform to each other, in step F511, the smartphone 301 transmits an authentication confirmation signal indicating a success in the authentication to the smartphone 304. Through the authentication processing, the smartphones 301 and 304 are brought into a state of having a common key used for the subsequent encryption communication.

After receiving the authentication confirmation signal, in step F512, the smartphone 304 transmits a setting request signal for requesting the communication parameters to the smartphone 301. After receiving the setting request signal, in step F513, the smartphone 301 transmits to the smartphone 304 a setting response signal including the communication parameters for communicating through the network 303 established by the access point 302. Here, the communication parameters are encrypted by using the common key shared in the authentication processing.

After acquiring the communication parameters, in step F514, the smartphone 304 transmits a connection request signal for connecting to the network 303 to the access point 302 based on the acquired communication parameters. The connection request signal includes at least the management apparatus information indicating that the communication apparatus that provides the communication parameters is the smartphone 301. After receiving the connection request signal, in step F515, the access point 302 checks whether the communication apparatus indicated by the management apparatus information included in the connection request signal is included in the stored list of management apparatuses. If the communication apparatus indicated by the management apparatus information included in the connection request signal is not included in the stored list of management apparatuses, the access point 302 rejects the connection request.

The access point 302 has registered as the management apparatus the smartphone 301 indicated by the management apparatus information included in the connection request signal in the list of management apparatuses. Accordingly, in step F516, the access point 302 transmits a connection permission signal for permitting the connection of the smartphone 304 to the smartphone 304.

The smartphone 304 can include the communication parameters acquired from the smartphone 301 such as the encryption key in the connection request signal. The access point 302 can check whether the encryption key included in the connection request signal conforms to the encryption key necessary for communicating through the network 303, and transmit the connection permission signal if they conform to each other.

After receiving the connection permission signal, in step F517, the smartphone 304 participates in the network 303 by executing necessary connection processing such as a four-way handshake with the access point 302.

After providing the communication parameters to the smartphone 304, the smartphone 301 additionally registers in the access point 302 as the management apparatus the communication apparatus, i.e., smartphone 304, to which the communication parameters are provided. In step F518, the smartphone 301 starts the registration processing based on the user having selected the smartphone 304 as the additional management apparatus.

In step F519, the smartphone 301 transmits a management apparatus registration request signal for requesting the registration of the smartphone 304 as the management apparatus to the access point 302. In order to prevent a registration request from an apparatus that spoofs the smartphone 301, the management apparatus registration request signal can be encrypted by using the common key shared by the smartphone 301 and the access point 302.

The access point 302 that has received the management apparatus registration request signal checks whether the smartphone 301, as the transmission source, has been registered as the management apparatus and checks whether the smartphone 304 that is the communication apparatus indicated by the identification information included in the management apparatus registration request signal has connected to the network 303. At this point, the access point 302 has registered the smartphone 301 as the management apparatus and the smartphone 304 has connected to the network 303. Accordingly, in step F520, the access point 302 adds the smartphone 304 to the list of management apparatuses in order to newly register the smartphone 304 as the management apparatus.

After the access point 302 has registered the smartphone 304 as the management apparatus, in step F521, the access point 302 transmits a registration request response signal indicating a success in the registration to the smartphone 301. After receiving the registration request response signal, in step F522, the smartphone 301 transmits a registration success notification indicating that the smartphone 304 has been registered as the management apparatus to the smartphone 304.

In the present exemplary embodiment, the access point 302 transmits the setting request signal for requesting the communication parameters to the smartphone 301 in step F505. However, if the access point 302 has already established the network 303, the access point 302 can include the communication parameters of the established network 303 in the setting request signal and transmit the setting request signal to the smartphone 301. In this case, the smartphone 301 can include the communication parameters received from the access point 302 in the setting response signal transmitted in step F506. With such configurations, the access point 302 that has already established the network 303 can just execute registration of the management apparatus without changing the communication parameters of the network 303.

If the smartphone 301 receives the communication parameters included in the setting request signal from the access point 302, the smartphone 301 can provide the communication parameters received from the access point 302 to the smartphone 304 together with the setting response signal transmitted in step F513.

If the additional management apparatus is not selected through the user operation in step F518, the smartphone 301 can always register in the access point 302 the communication apparatus that has provided the communication parameters as the management apparatus.

The smartphone 301 can determine whether to execute the registration processing based on the performance information about the smartphone 304 included in the setting request signal received in step F512. For example, the performance information can indicate whether the user wishes to make the smartphone 304 operate as the management apparatus. The performance information can indicate whether the smartphone 304 has an image-capturing function and can be operated as the management apparatus. If the smartphone 304 does not have the image-capturing function and cannot be operated as the management apparatus, the smartphone 301 does not execute the registration processing for registering the smartphone 304 in the access point 302 as the management apparatus. In other words, based on the performance information, the smartphone 301 can eliminate the communication apparatus that cannot be operated as the management apparatus from a selection target of the additional management apparatus.

The smartphone 301 can transmit the management apparatus registration request signal to the access point 302 in response to the setting request signal received from the smartphone 304 in step F512. Then, the smartphone 301 can include in step F513 the content of the notification signal indicating the registration result received from the access point 302 in the setting response signal.

Figure 6:
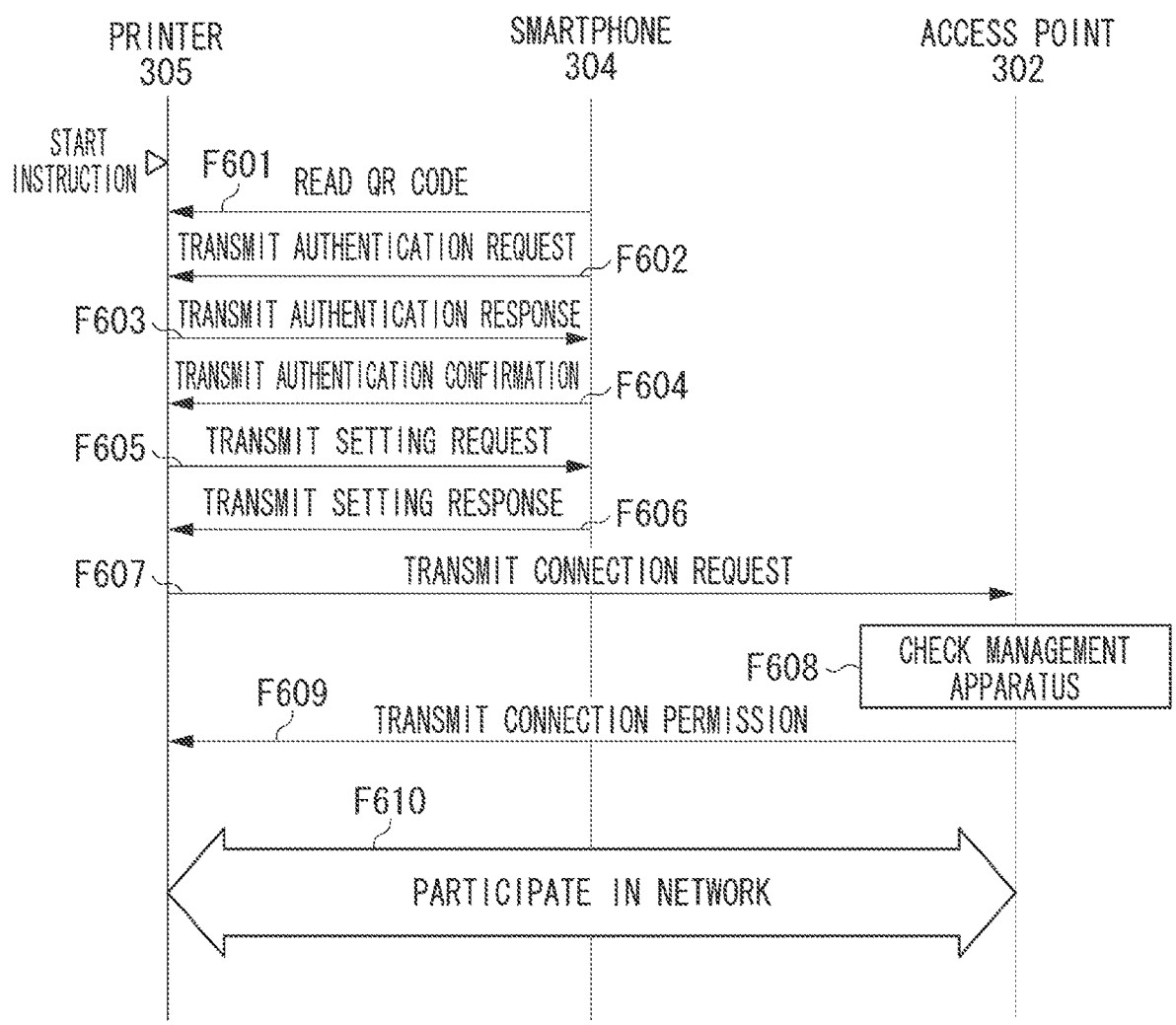
FIG. 6 is a sequence diagram illustrating a sequence of processing executed by communication apparatuses.

FIG. 6 is a diagram illustrating a sequence of processing in which the smartphone 304 connects the printer 305 to the access point 302 as the management apparatus after the processing in FIG. 5 is executed.

The smartphone 304 activates a camera in a case where the user instructs the smartphone 304 to set the communication parameters to other communication apparatus. The printer 305 displays a QR Code® including the information necessary for setting the communication parameter in a case where the user instructs the printer 305 to set the communication parameters. In addition, the printer 305 can print the QR Code® including the information necessary for setting the communication parameters.

In step F601, the smartphone 304 captures the QR Code® to be displayed by the printer 305 and acquires information necessary for setting the communication parameters from the QR Code®. In steps F602 to F606, as in the processing described in steps F509 to F513, the smartphone 304 and the printer 305 execute authentication processing and communication parameter setting.

After acquiring the communication parameters from the smartphone 304, in step F607, the printer 305 transmits a connection request signal for connecting to the network 303 to the access point 302 based on the acquired communication parameters. The connection request signal includes at least the management apparatus information indicating that the communication apparatus that provides the communication parameters is the smartphone 304.

After receiving the connection request signal, in step F608, the access point 302 checks whether the communication apparatus indicated by the management apparatus information included in the connection request signal is included in the stored list of management apparatuses. In step F609, the access point 302 confirms that the smartphone 304 is the management apparatus registered in response to the request from the smartphone 301 and transmits a connection permission signal for permitting the connection of the printer 305 to the printer 305.

The printer 305 can include the communication parameters acquired from the smartphone 304, such as the encryption key in the connection request signal. The access point 302 can transmit the connection permission signal in a case where the encryption key included in the connection request signal conforms to the encryption key necessary for communicating through the network 303 after checking whether the encryption keys conform to each other.

After receiving the connection permission signal, in step F610, the printer 305 participates in the network 303 by executing necessary connection processing such as a four-way handshake with the access point 302.

As described above, since the access point 302 registers the communication apparatus authorized to set the communication parameters by using the captured code information, the communication parameters can be prevented from being set even if the code information is captured by an unauthorized communication apparatus. Further, the configuration enables addition, as a management apparatus, of only an apparatus that the management apparatus intends to register as a management apparatus having directly executed the authentication processing with the access point 302, which enhances the security of the entire network 303.

According to the present exemplary embodiment, the smartphone 301 that has directly executed the authentication processing with the access point 302 can register the smartphone 304 in the access point 302 as the additional management apparatus. For example, if, after the smartphone 301 executes the authentication processing with the access point 302 and sets the communication parameters to the access point 302, the access point 302 is positioned in a location where image capturing is difficult to execute, e.g., installed on the ceiling of an office environment. In such a case, if the smartphone 304 is to be newly registered as the management apparatus, the user does not have to capture the access point 302 when the access point 302 is located in an area difficult to access. Thus, a degree of freedom in arranging the access point 302 after execution of initial setting is increased, improving usability.

The smartphone 301 can register the smartphone 304 in the access point 302 as the management apparatus through the process of setting in the smartphone 304 the communication parameters for connecting to the access point 302. Accordingly, in a case where the access point 302 additionally registers the management apparatus, the smartphone 304 does not have to separately execute communication for being registered as the management apparatus with the access point 302 after the smartphone 304 has become communicable with the access point 302. Accordingly, such a configuration facilitates the processing for additionally registering the communication apparatus authorized to set the communication parameters by using the captured code information, which improves the usability.

If a registration request is transmitted from the smartphone 301 that has directly executed the authentication processing with the access point 302, the smartphone 304 can be registered as the management apparatus without directly executing the authentication processing with the access point 302. In other words, the user can register the smartphone 304 as the management apparatus by simply executing the processing for making the smartphone 304 participate in the network 303, and thus the user does not have to execute the authentication processing for registration as the management apparatus by separately capturing the QR Code® through the smartphone 304. Accordingly, usability in additionally registering the management apparatus in the access point 302 can be improved.

After the smartphone 304 is registered as the management apparatus, the printer 305 can be connected to the network 303 without the smartphone 301. This configuration improves usability in newly connecting an apparatus to the network 303.

OTHER EXEMPLARY EMBODIMENTS

In the above-described exemplary embodiment, the smartphone 304 operates as the apparatus that displays the QR Code® and the smartphone 301 operates as the apparatus that captures the QR Code®. However, the smartphone 304 can operate as the apparatus that captures the QR Code® and the smartphone 301 can operate as the apparatus that displays the QR Code®. The smartphones 301 and 304 can also select whether to operate as the apparatus that displays or captures the QR Code®. In such a case, the smartphones 301 and 304 can select whether to operate as the apparatus that displays or captures the QR Code® according to a user instruction.

In the above-described exemplary embodiment, description has been provided to a configuration in which the information used for setting the communication parameters is exchanged between the communication apparatuses using the captured image of the code information, such as the QR Code®. However, wireless communication such as near field communication (NFC) or Bluetooth® can be used instead of capturing the QR Code®. Wireless communication compliant with the IEEE 802.11 series standard or Transfer Jet® can also be used.

The code information is not limited to code information displayed on a display unit, and the code information can be attached to a housing of the communication apparatus in a form of a sticker or label. Further, the code information to be read can be included in the communication apparatus' instruction manual or on the communication apparatus' packing material, such as a cardboard, used to ship/deliver the communication apparatus. The code information can be a one-dimensional code such as a barcode or a two-dimensional code of any other type. The code information can be the information in a format readable by the user instead of machine-readable information, such as the QR Code®.

In the above-described exemplary embodiment, although communication between the communication apparatuses is executed by a wireless LAN communication compliant with IEEE 802.11 series standard, the communication method is not limited thereto. For example, the communication can be executed by using a wireless communication medium such as a wireless universal serial bus (USB), a multi band OFDM alliance (MBOA), Bluetooth®, an ultrawideband (UWB), ZigBee, or NFC. The UWB includes the wireless USB, the wireless 1394, and the WINET.

As described above, improving usability in additionally registering a communication apparatus authorized to set communication parameters by using captured code information can be achieved.

Exemplary embodiments can also be realized by the process of supplying a program for implementing one or more functions of the above exemplary embodiments to a system or an apparatus via a network or a storage medium, and causing one or more processors of a computer of the system or the apparatus to read and execute the program. Exemplary embodiments can be also realized with a circuit (e.g., ASIC) that realizes one or more functions.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
   one or more processors; and
   one or more memories including instructions that, when executed by the one or more processors, cause the communication apparatus to:
   acquire information regarding a first public key of the access point;
   request the access point to execute authentication processing based on the acquired information regarding the first public key of the access point; and
   provide, in a case where the authentication processing is successful, the access point with a communication parameter for forming the wireless network;
   acquire information regarding a second public key of a first communication apparatus;
   request the first communication apparatus to execute authentication processing based on the acquired information regarding the second public key; and
   set, in a case where the authentication processing is successful, the first communication apparatus as an apparatus that provides a second communication apparatus with the communication parameter for connection to a wireless network which is formed by the access point different from the first communication apparatus and the second communication apparatus.

2. The communication apparatus according to claim 1, wherein, in order to set the first communication apparatus as the apparatus that provides the second communication apparatus with the communication parameter, the communication apparatus registers the first communication apparatus as the apparatus that provides the second communication apparatus with the communication parameter into a base station of the wireless network.

3. The communication apparatus according to claim 2, wherein the communication apparatus registers the first communication apparatus to the base station without the base station and the first communication apparatus executing the authentication processing.

4. The communication apparatus according to claim 2, wherein the communication apparatus registers the first communication apparatus to the base station by transmitting a registration request for requesting registration of the first communication apparatus to the base station.

5. The communication apparatus according to claim 4, wherein the registration request includes identification information about the first communication apparatus.

6. The communication apparatus according to claim 2, wherein the execution of the instructions further causes the communication apparatus to:
   receive information indicating whether the base station has registered the first communication apparatus as the apparatus that provides the second communication apparatus with the communication parameter.

7. The communication apparatus according to claim 6, wherein the execution of the instructions further causes the communication apparatus to:
   notify the first communication apparatus of a result indicated by the received information.

8. The communication apparatus according to claim 1, wherein
   the wireless network which is able to be connected by using a communication parameter provided by the communication apparatus and the wireless network which is able to be connected by using the communication parameter provided by the first communication apparatus are the same wireless network.

9. The communication apparatus according to claim 1, wherein the execution of the instructions further causes the communication apparatus to:
   transmit information that is necessary for setting the first communication apparatus as the apparatus that provides the second communication apparatus with the communication parameter, in a case where the first communication apparatus has been set as the apparatus that provides the second communication apparatus with the communication parameter.

10. The communication apparatus according to claim 1, wherein the execution of the instructions further causes the communication apparatus to:
    determine whether to set the first communication apparatus as the apparatus that provides the second communication apparatus with the communication parameter based on a user instruction, wherein the communication apparatus determines to set the first communication apparatus as the apparatus that provides the second communication apparatus with the communication parameter in a case where the first communication apparatus is selected as the apparatus that provides the second communication apparatus with the communication parameter by a user.

11. The communication apparatus according to claim 1, wherein the execution of the instructions further causes the communication apparatus to:
determine whether to set the first communication apparatus as the apparatus that provides the second communication apparatus with the communication parameter based on information indicating whether the first communication apparatus has a performance for operating as the apparatus that provides the second communication apparatus with the communication parameter,
wherein the communication apparatus does not determine to set the first communication apparatus as the apparatus that provides the second communication apparatus with the communication parameter in a case where the first communication apparatus does not have the performance.

12. The communication apparatus according to claim 1, wherein the execution of the instructions further causes the communication apparatus to:
determine whether to set the first communication apparatus as the apparatus that provides the second communication apparatus with the communication parameter based on whether the first communication apparatus has an image-capturing function,
wherein the communication apparatus does not determine to set the first communication apparatus as the apparatus that provides the second communication apparatus with the communication parameter in a case where the first communication apparatus does not have the image-capturing function.

13. The communication apparatus according to claim 1, wherein the execution of the instructions further causes the communication apparatus to:
capture an image of code information corresponding to the first communication apparatus,
wherein the communication apparatus acquires the information regarding the second public key from the image of the code information.

14. The communication apparatus according to claim 13, wherein the code information is a barcode or a two-dimensional code.

15. The communication apparatus according to claim 1, wherein the communication apparatus acquires the information regarding the second public key from the first communication apparatus via wireless communication compliant with NFC (Near Field Communication).

16. The communication apparatus according to claim 1, wherein
the communication apparatus acquires the information regarding the second public key from the first communication apparatus via wireless communication compliant with Bluetooth.

17. The communication apparatus according to claim 1, wherein the authentication processing is executed based on a hash value about the second public key.

18. The communication apparatus according to claim 1, wherein a communication parameter provided by the communication apparatus includes at least any one of a service set identifier (SSID), an encryption key, an encryption method, a network key, an authentication key, or an authentication method.

19. The communication apparatus according to claim 1, wherein a communication parameter provided by the communication apparatus is information for executing communication compliant with the Institute of Electrical and Electronics Engineers (IEEE) 802.11 series standard.

20. A communication method performed by a communication apparatus, the method comprising:
acquiring information regarding a first public key of the access point;
requesting the access point to execute authentication processing based on the acquired information regarding the first public key of the access point; and
providing, in a case where the authentication processing is successful, the access point with a communication parameter for forming the wireless network;
acquiring information regarding a second public key of a first communication apparatus;
requesting the first communication apparatus to execute authentication processing based on the acquired information regarding the second public key; and
setting, in a case where the authentication processing is successful, the first communication apparatus as an apparatus that provides a second communication apparatus with the communication parameter for connection to the wireless network which is formed by the access point different from the first communication apparatus and the second communication apparatus.

21. A non-transitory computer readable storage medium storing an instruction for causing a computer to execute a method, the method comprising:
acquiring information regarding a first public key of the access point;
requesting the access point to execute authentication processing based on the acquired information regarding the first public key of the access point; and
providing, in a case where the authentication processing is successful, the access point with a communication parameter for forming the wireless network;
acquiring information regarding a second public key of a first communication apparatus;
requesting the first communication apparatus to execute authentication processing based on the acquired information regarding the second public key; and
setting, in a case where the authentication processing is successful, the first communication apparatus as an apparatus that provides a second communication apparatus with the communication parameter for connection to the wireless network which is formed by an the access point different from the first communication apparatus and the second communication apparatus.

* * * * *